United States Patent
Carlton

(10) Patent No.: US 10,298,631 B2
(45) Date of Patent: *May 21, 2019

(54) SOCIAL LISTENING AND FILTER RULE MODIFICATION

(71) Applicant: ADOBE INC., San Jose, CA (US)

(72) Inventor: Tyler William Carlton, Highland, UT (US)

(73) Assignee: ADOBE INC., San Jose, CA (US)

( * ) Notice: Subject to any disclaimer, the term of this patent is extended or adjusted under 35 U.S.C. 154(b) by 690 days.

This patent is subject to a terminal disclaimer.

(21) Appl. No.: 14/186,861

(22) Filed: Feb. 21, 2014

(65) Prior Publication Data

US 2015/0242749 A1    Aug. 27, 2015

(51) Int. Cl.
*G06Q 50/00*     (2012.01)
*H04L 29/06*     (2006.01)
*G06N 20/00*     (2019.01)

(52) U.S. Cl.
CPC ........... *H04L 65/403* (2013.01); *G06Q 50/01* (2013.01); *G06N 20/00* (2019.01)

(58) Field of Classification Search
CPC ...... G06N 99/00; G06N 20/00; H04L 65/403; H06Q 50/01
See application file for complete search history.

(56) References Cited

U.S. PATENT DOCUMENTS

| | | | | |
|---|---|---|---|---|
| 2013/0138425 A1* | 5/2013 | Luke | ................ | G06F 17/30716 704/9 |
| 2013/0290333 A1* | 10/2013 | Fraczak | ................ | G06Q 30/02 707/737 |
| 2014/0122377 A1* | 5/2014 | Goodman | .............. | G06Q 30/02 706/11 |

OTHER PUBLICATIONS

A. Arnt and S. Zilberstein, "Learning to perform moderation in online forums", Proc. IEEE/WIC Int'l Conf. on Web Intelligence, 2003, 5 pages.*
F. Sebastiani "Machine learning in automated text categorization", ACM Computing Surveys (CSUR), 34.1, 2002, pp. 1-47.*
S. Gensler et al., "Managing Brands in the Social Media Environment", J. Interactive Marketing, vol. 27, 2013, pp. 242-256.*
A. Tybout and M. Roehm, "Let the Response Fit the Scandal", Harvard Bus. Rev., Dec. 2009, pp. 82-89.*

* cited by examiner

*Primary Examiner* — Vincent Gonzales
(74) *Attorney, Agent, or Firm* — Shook, Hardy & Bacon L.L.P.

(57) ABSTRACT

Listening rules and/or filter rules are generated or modified for use by a social analysis tool to capture and/or filter social mentions from social networking services for moderation purposes. The text and metadata of social mentions that have previously been moderated may be analyzed to identify common text and/or common metadata amongst those social mentions. The new listening and/or filter rules may be generated by selecting criteria for the rules based on the identified common text and/or common metadata. The new listening rules and/or filter rules may then be applied to capture and/or filter new social data.

20 Claims, 9 Drawing Sheets

SOCIAL LISTENING AND FILTER RULE MODIFICATION

BACKGROUND

Social networking has become an increasingly popular presence on the Internet. Social network services allow users to easily connect with friends, family members, and other users in order to share, among other things, comments regarding activities, interests, and other thoughts. As social networking has continued to grow, companies have recognized value in the technology. For instance, companies have found that social networking provides a great tool for managing their brand and driving consumers to their own web sites or to otherwise purchase their products or services. Companies can create their own social networking profiles for communicating with consumers via social networking posts and other messages. Additionally, since users often employ social networking to comment on products and services, companies can mine social data to identify what consumes are saying about the company, as well as its products, services, and industry in general. In some cases, companies may even choose to respond to consumers' comments on social networks.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention generally relate to generating or improving the rules used by a social analysis tool to capture and/or filter social data from social networks for moderation purposes (e.g., responding to social networking messages). Data regarding social mentions for which moderations actions have previously been taken may be analyzed to generate the new rules. This may include analyzing the text and metadata of the social mentions that have previously been moderated to identify commonalities within the text and metadata. The new rules may be generated by selecting criteria based on the commonalities such that the criteria reflects text and/or metadata of social mentions likely to be moderated in the future. Accordingly, the new rules are generated in order to reduce the number of social mentions for review while accurately capturing social mentions likely to be moderated.

BRIEF DESCRIPTION OF THE DRAWINGS

The present invention is described in detail below with reference to the attached drawing figures, wherein.

DETAILED DESCRIPTION

Figure 1:
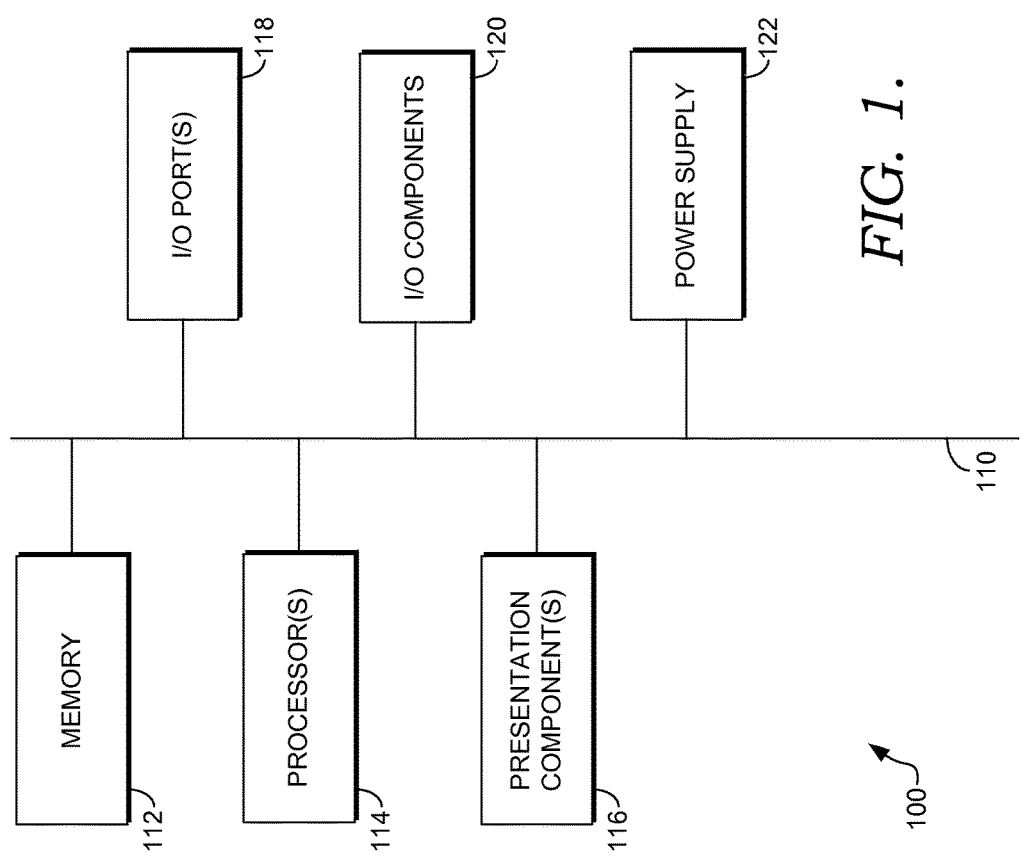
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

To assist companies in their social networking efforts, some social analysis tools, such as the ADOBE SOCIAL tool, have been developed that provide mechanisms for companies to collect information regarding what consumers are saying and manage responses to consumers' social networking messages. These social analysis tools allow companies to set rules for capturing social data from social networks. The captured social data may be provided by a social analysis tool as a list of social mentions that each may include the text of a social networking message and metadata associated with the message. A person (i.e., a moderator) may review each social mention and determine to take moderation actions on some of the social mentions, such as posting responses to the social networking messages. Often, a large number of social mentions are captured, but moderation actions are taken on a very small subset of those social mentions. Therefore, the rules are typically too broad, and a moderator has too much data to sift through to find the small subset of social mentions to take actions on.

Embodiments of the present invention are generally directed to generating new rules or improving existing rules to reduce the number of social mentions that need to be reviewed by a moderator while still providing social mentions that are likely to be moderated. This allows the moderation process to be more efficient and less time consuming. Generally, social mentions that have been previously moderated may be analyzed to identify common text and/or metadata from those social mentions. For instance, machine-learning algorithms may be employed to identify patterns in the text and/or metadata of the moderated social mentions. New rules may be defined with criteria corresponding with the common text and/or metadata identified from the analysis. The new rules may then be employed to capture or filter new social data that provides a smaller set of social mentions that are more likely to be moderated. In some embodiments, the new rules may be generated by also analyzing previously captured social mentions that were not moderated to identify commonalities of those non-moderated social mentions. In further embodiments, the new rules may also be generated by considering the criteria of the existing rules.

Various terms are used throughout this description. Definitions of some terms are included below to provide a clearer understanding of the ideas disclosed herein:

The terms "social networking service" and "social networking site" refer to any online presence at which a user may share comments with other users within a social network. For instance, this may include services, such as the TWITTER, FACEBOOK, LINKEDIN, TUMBLR, and YOUTUBE services, to name a few.

A "listening rule" refers to criteria, such as text, phrases, and/or metadata, used to capture social data from social networking services that is then provided to a moderation tool as social mentions.

A "social mention" includes any social networking message that matches the criteria set forth by one or more listening rules.

A "moderation tool" refers to a component of a social analysis tool that receives social mentions captured using a listening rule and allows a moderator to review the social mentions and take moderation actions on the social mentions.

A "filter rule" refers to criteria, such as text, phrases, and/or metadata, used to filter captured social mentions that are displayed within a moderation tool to a moderator.

A "moderator" is a person who is responsible for reviewing social mentions for a company and deciding whether to take moderation actions on certain social mentions.

As used herein, the term "moderation action" refers to any action that may be taken for a social mention. This may include, for instance, responding to a social message, such as responding to a tweet from a consumer using the TWITTER service. In some instances, a moderation action may be an action internal to a company, such as flagging a social mention for escalation or review by another moderator within the company.

A "moderated social mention" refers to a social mention for which a moderation action or particular type of moderation action has been taken.

A "non-moderated social mention" refers to a social mention for which a moderation action or a particular type of moderation action has not been taken.

An "action rule" refers to criteria, such as text, phrases, and/or metadata, used to identify social mentions for which a particular type of moderation action may be automatically performed or recommended.

Figure 2:
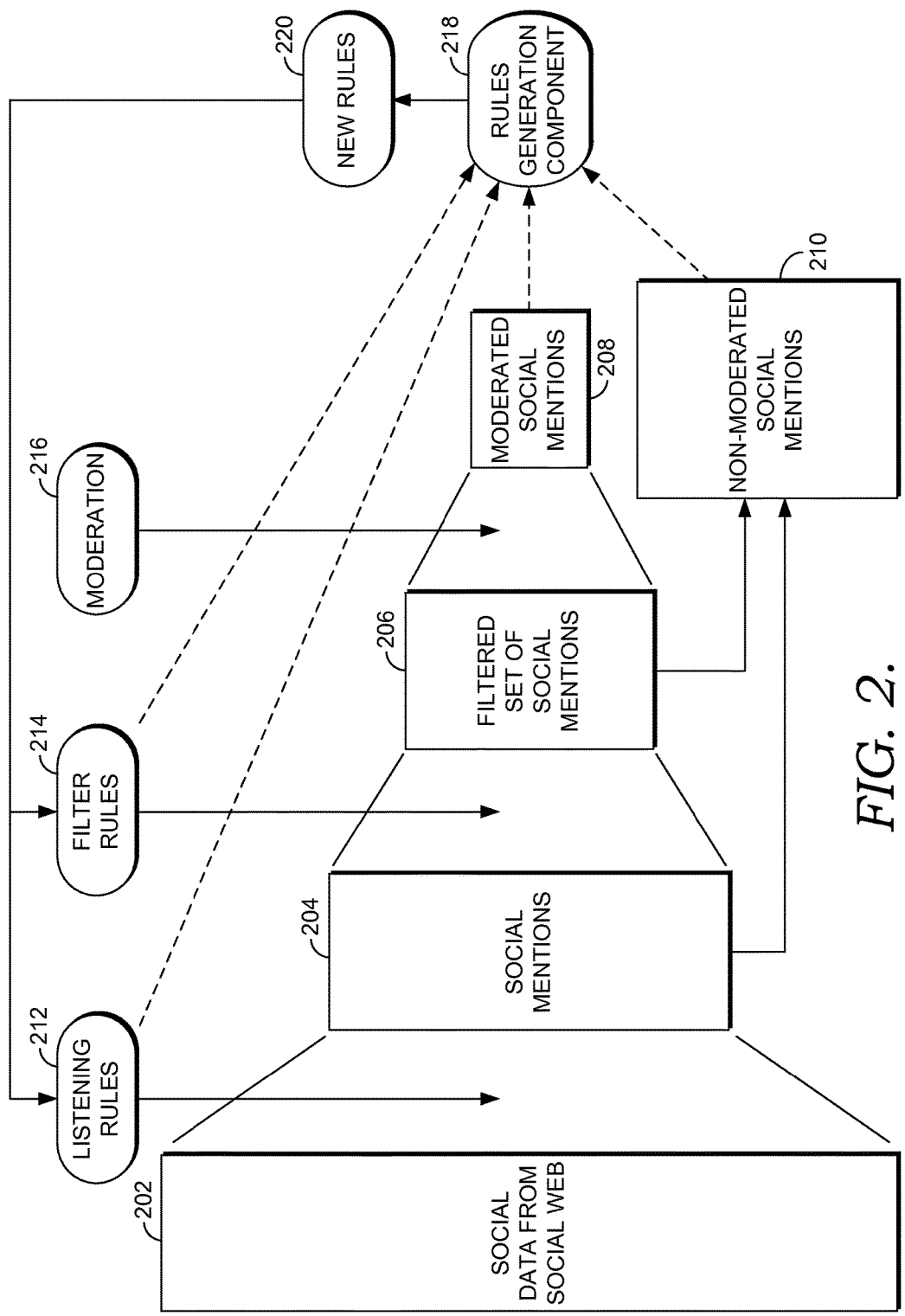
FIG. 2 is a diagram illustrating analyzing moderation of social mentions to generate or improve listening and/or filtering rules in accordance with an embodiment of the present invention.

Turning now to FIG. 2, a block diagram is provided that illustrates collection and moderation of social mentions and analyzing the moderation of social mentions to improve listening and/or filtering rules. As shown in FIG. 2, a large amount of social data 202 is available from the social web, which may include any number of social networking services or sites. The amount of social data 202 available is extremely large, and it would be impractical for a company to look through all the data to manage its brand, identify industry trends, or achieve other objectives. As such, a social analysis tool may allow a company to define listening rules 212 to identify particular social data that is relevant to the company. The listening rules 212 may set forth particular criteria such as text, phrases, or other metadata. Social data from the social web is identified using the criteria to provide a set of social mentions 204, which include any social networking message that matches the criteria set forth by the listening rules 212.

The set of social mentions 204 captured using the listening rules 212 may be provided to a moderation tool within the social analysis tool. The moderation tool may present the social mentions 204 to a moderator and allow the moderator to take moderation actions 216 on some social mentions. As such, the moderation tool allows the company (through its moderators) to watch consumer comments from the social web that satisfy the listening rules 212 and to actively engage with the community of consumers when desired.

Depending on the breadth of the listening rules 212, the number of social mentions 204 originally captured by the listening rules 212 may be extremely large, making it very time consuming for a moderator or group of moderators to review the social mentions 204. In some instances, filter rules 214 may be established that are used by the moderation tool to filter the social mentions 204 displayed to a moderator. This may provide a filtered set of social mentions 206, which may include a subset of social mentions that are more likely to be moderated. Accordingly, moderation actions 216 may be taken by a moderator reviewing either the entire set of social mentions 204 captured by the listening rules 212 or a filtered set of social mentions 206 provided by applying filter rules 214.

Regardless if the moderator is working from the set of social mentions 204 or the filtered set of social mentions 206, moderation actions 216 are typically taken on only a very small subset of the social mentions. As represented in FIG. 2, the number of moderated social mentions 208 (i.e., social mentions for which moderation actions were taken) is typically much smaller than the number of non-moderated social mentions 210 (i.e., social mentions for which no moderation actions were taken). As such, while the listening rules 212 and filter rules 214 operate to provide somewhat manageable sets of social mentions for review, the rules are often too broad and capture too much data. This results in additional and unnecessary time for moderators to sift through the data to identify social mentions to moderate.

Embodiments of the present invention provide, among things, a rules generation component 218 that may provide new rules 220 that better identify social mentions most likely to be moderated and thereby reduce the number of social mentions that need to be reviewed by a moderator. As will be discussed in further detail below, the rule generation component 218 may analyze data regarding moderated social mentions 208, non-moderated social mentions 210, the original listening rules 212, and/or the original filter rules 214 to generate the new rules 220. Generally, the rule generation component 218 may operate to identify commonalities of social mentions that cause the social mentions to be moderated or not moderated and provide the new rules 220 in accordance with the analysis. The new rules 220 may be applied as new listening rules when new social data is accessed from the social web to narrow down the number of social mentions captured from the social web and/or as new filter rules to reduce the number of social mentions presented to a moderator in the moderation tool. Additionally, the rules generation component 218 may continuously or periodically operate to analyze data and further refine the listening rules and/or filter rules.

Accordingly, in one aspect, an embodiment of the present invention is directed to a non-transitory computer storage medium storing computer-useable instructions that, when used by one or more computing devices, cause the one or more computing devices to perform operations. The operations include analyzing text and metadata of social mentions for which moderation actions have been taken to identify commonalities within the text and metadata. The operations also include generating one or more listening rules with criteria selected based on the commonalities identified by analyzing the text and metadata of the social mentions. The operations further include applying the one or more listening rules to capture new social data from one or more social networks.

In another embodiment of the invention, an aspect is directed to a computer-implemented method. The method includes analyzing, by a computing device, text and metadata of social mentions for which moderation actions have been taken to identify commonalities within the text and metadata. The method also includes generating one or more filter rules with criteria selected based on the commonalities identified by analyzing the text and metadata of the social mentions. The method further includes employing the one or more filter rules to filter new social data captured from one or more social networks to provide a plurality of filtered social mentions for presentation in a moderation user interface.

A further embodiment is directed to a computer-implemented method. The method includes applying, by a computing device, a set of filter rules to filter out social mentions to provide a set of filtered social mentions. The method also includes analyzing text and metadata of those of the filtered social mentions for which moderation actions have been taken to identify commonalities within the text and metadata. The method further includes modifying the filter rules with criteria selected based on the commonalities identified by analyzing the text and metadata of the filtered social mentions such that the modified filter rules can be applied to filter new social data captured from one or more social networks.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 3:
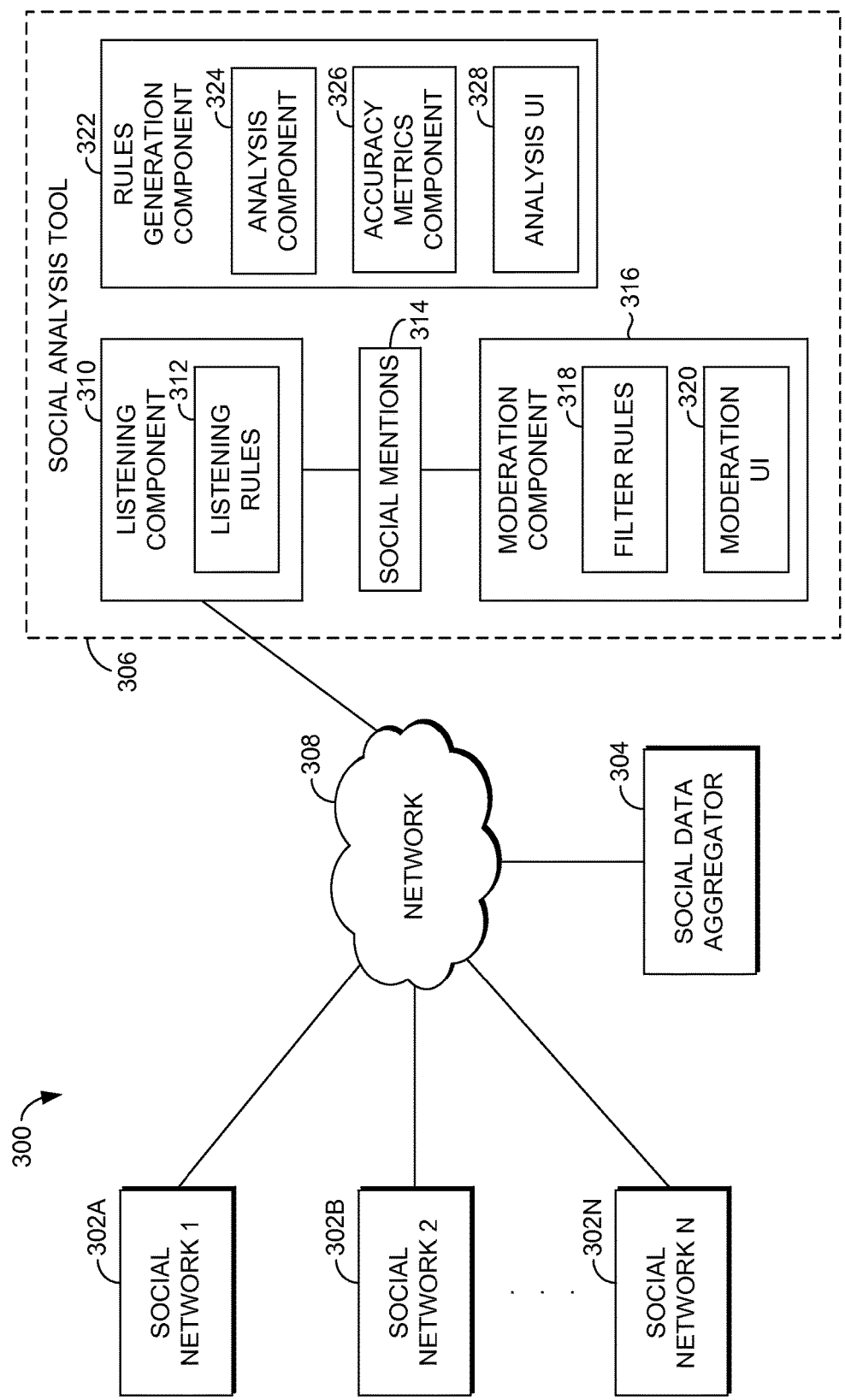
FIG. 3 is a block diagram of an exemplary system architecture in which embodiments of the invention as shown in FIG. 2 may be employed.

Turning now to FIG. 3 a block diagram is provided illustrating an exemplary system 300 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 300 may include a number of social networking services 302A, 302B, 302N, a social data aggregator 304, and a social analysis tool 306. It should be understood that the system 300 shown in FIG. 3 is an example of one suitable computing system architecture. Each of the components shown in FIG. 3 may be implemented via any type of computing device, such as computing device 100 described with reference to FIG. 1, for example. The components may communicate with each other via a network 308, which may include, without limitation, one or more local area networks (LANs) and/or wide area networks (WANs). Such networking environments are commonplace in offices, enterprise-wide computer networks, intranets, and the Internet. It should be understood that any number of social networking services, social data aggregators, and social analysis tools may be employed within the system 300 within the scope of the present invention. Each may comprise a single device or multiple devices cooperating in a distributed environment. For instance, the social analysis tool 306 may be provided via multiple devices arranged in a distributed environment that collectively provide the functionality described herein. Additionally, other components not shown may also be included within the network environment.

The social analysis tool 306 may be employed by a company to assist in managing the company's brand. Initially, the social analysis tool 306 operates to collect social data from social networking services 302A, 302B, 302N. As represented in FIG. 3, social data may be collected from any number of social networking services. These services generally include any online presence at which users may share messages with other users within a social network of users. In some instances, the social analysis tool 306 may access social data directly from a social networking service or an entity providing the social analysis tool 306 may access the data from a social networking service and provide the data to the tool 306. For instance, a social networking service may provide APIs that expose the data. In other instances, the social analysis tool 306 may access social data from a third-party social data aggregator 304 (e.g., the GNIP service), which may operate to access data from one or more social networking services, standardize the data, and provide the standardized data. Any and all such variations are contemplated to be within the scope of embodiments of the present invention.

As shown in FIG. 3, the social analysis tool 306 includes, among other things not shown, a listening component 310, moderation component 318, and rules generation component 322. The listening component 310 includes one or more listening rules 312. The listening rules 312 include criteria that are used by the listening component 310 to identify particular social mentions from the social data. The listening rules 312 may be defined by the company or on behalf of the company to satisfy whatever objectives the company may have. Generally, any aspect of social messages that may be of interest to a company may be included as criteria in a listening rule. The criteria may include specific terms or phrases included within social messages. For example, the terms may include the company's trademarks or terms relevant to the company's products, services, industry, or otherwise of interest to the company. The terms may be bare terms or may be terms associated with a hashtag or other term tagging mechanism employed by users. Any number of terms or phases may be included within the listening rules 312.

The listening rules 312 may also include metadata criteria. In particular, a variety of metadata may be associated with each social message. This may include, for instance, information regarding: the author of the social message (e.g., demographic information, name or other identification, location, language the author claims to speak, number of messages previously captured by the listening rules 312 for the author, Klout score, number of followers, etc.); number of comments, retweets, or other messages from other users on the social message; social networking service on which the social message was posted; and day/time when the social message was posted. The listening rules 312 may include criteria specifying different combinations of metadata.

Any number of listening rules 312 may be defined for the listening component 310. In some cases, a single listening rule could be used to generally identify a group of social mentions. In other cases, multiple listening rules may be established with different criteria. For example, listening rules may be used that have different breadth and/or that focus on different aspects of social data. Social mentions captured using multiple listening rules may be combined into a single set of social mentions or may be maintained in separate groups that allow a moderator to view the groupings separately.

The listening component 310 applies the listening rules 312 to social data accessed from social networking services 302A, 302B, 302N and/or the social data aggregator 304 to identify social mentions 314 that satisfy the criteria set forth by the listening rules 312. The social mentions 314 captured by the listening component 310 are provided to the moderation component 316.

The moderation component 316 includes a moderation user interface (UI) 320. The moderation UI 320 may be employed by a moderator to review social mentions and take moderation actions on some of the social mentions. In some instances, the moderation UI 320 may be employed to view all social mentions 314 captured by the listening component 310 (either in a single listing or in separate groupings if multiple listening rules are employed). In other instances, filter rules 318 may be used to filter the social mentions presented by the moderation UI 320. The filter rules 318 may be based on text and/or metadata similar to the criteria available for the listening rules 312 discussed above. A filter rule may be pre-established; while in other instances, a filter rule may be created by a moderator on an ad hoc basis. Additionally, any number of filter rules 312 may be employed. In some cases, a single filter rule may be employed to generally filter the social mentions presented to a moderator. In other cases, multiple filter rules of different breadth and/or directed to different aspects may be employed that facilitate a moderator viewing social mentions in different groupings. For instance, a moderator may wish to first view social mentions that match some specific, high-interest criteria and then later view other social mentions meeting other criteria. This allows moderators to control their workflow and to prioritize the social mentions they review and moderate.

A moderator may employ the moderation UI 320 to view social mentions and take moderation actions on social mentions the moderator decides actions should be taken. Information regarding which social mentions are moderated and/or which social mentions are not moderated may be tracked and stored for use by the rules generation component 322.

The rules generation component 322 generally operates to generate new listening rules and/or filter rules that better identify social mentions likely to be moderated, thereby reducing the overall number of social mentions that need to be reviewed by a moderator. In various embodiments of the present invention, the rules generation component 322 includes an analysis component 324 that may analyze data associated with moderated social mentions, non-moderated social mentions, criteria of the listening rules 312, and/or criteria of the filter rules 318 when generating new listening rules and/or new filter rules.

For example, in one embodiment, the analysis component 324 may analyze information from moderated social mentions in generating new rules. More particularly, the analysis component 324 may analyze aspects of the moderated social mentions, such as, for instance, the text of the moderated social mentions and metadata associated with the moderated social mentions. The metadata may include, by way of example only and not limitation, information regarding: the author of the social message (e.g., demographic information, name or other identification, location, language the author claims to speak, number of messages previously captured by the listening rules 312 for the author, Klout score, number of followers, etc.); number of comments, retweets, or other messages from other users on the social message; social networking service on which the social message was posted; day/time when the social message was posted, criteria from a listening rule and/or filter rule the social message satisfied, and scores/rankings applied to the social message (e.g., a sentiment score or emotion score or other metadata that reflects the user's sentiment or emotions connected with the message—positive, negative, happy, angry, sad, etc.).

The analysis component 324 may analyze the data associated with the moderated social mentions to identify commonalities among them. This allows the analysis component 324 to identify what aspects of the moderated social mentions are in common and are therefore aspects that may be used to identify social mentions likely to be moderated in the future. In some embodiments, machine-learning algorithms may be employed to identify patterns in the text and/or metadata of the moderated social mentions. In some instances, this may result in a single rule being generated based on text and/or metadata common to the moderated social mentions. In other instance, this may result in multiple rules being generated. For example, analysis of moderated social mentions may identify that social mentions with a particular term from authors within a particular geographical region are typically moderated and that social mentions from a particular social networking service with a particular sentiment (e.g., positive) are also typically moderated. This may result in the generation of two rules: (1) the particular term identified in association with metadata indicating an author from the identified geographical region; and (2) metadata indicating a social message is from the identified social networking service and has the identified sentiment. As can be understood, a variety of different rules may be generated based on the commonalities identified by the analysis component.

In some instances, different types of moderation actions may be taken on social mentions. In such instances, data may be stored regarding the type of moderation action taken on the various social mentions. That data may then be used as part of the analysis and generation of new rules. For example, only social mentions having a certain type of moderation action may be considered by identifying commonalities among those social mentions and generating the new rules based on that analysis.

In some embodiments, the analysis component 324 may analyze data associated with non-moderated social mentions to generate new rules. The data may include the text and/or metadata associated with the non-moderated social mentions. Any metadata, such as the examples provided above for the moderated social mentions, may be employed. Additionally, the analysis may be similar to that discussed above for the moderated social mentions. More particularly, the analysis component 324 may analyze the data to identify commonalities among the non-moderated social mentions. However, the analysis in this instance identifies aspects of social mentions that are not likely to be moderated.

The analysis component 324, in some instances, may employ data from both moderated social mentions and non-moderated social mentions when generating new rules. For instance, the analysis of both moderated social mentions and non-moderated social mentions may help identify common aspects of social mentions that are moderated and common aspects of social mentions that are not moderated. As such, the analysis component 324 may generate new rules based on combinations of these aspects.

The analysis component 324 may also employ the listening rules 312 and/or filter rules 318 when generating new rules. For instance, in some embodiments, the analysis component 324 may analyze moderated and/or non-moderated social mentions in conjunction with the listening rules and/or filter rules and generate the new rules by simply making adjustments to the listening rules and/or filter rules. In instances in which multiple rules are being used, an analysis may be performed on a single rule to modify only that rule. It should be understood, however, that the analysis component 324 may generate new rules independent of the existing listening rules or filter rules based on analysis of the moderated and/or non-moderated social mentions.

In further embodiments, the analysis component 324 may only analyze the filter rules 318 to generate new listening rules. For instance, in some cases, a company may have multiple moderators reviewing and moderating on social mentions. Each moderator may have his/her own filter rule or set of filter rules. The analysis component 324 may operate to analyze the various filter rules to identify commonalities among them. This analysis identifies aspects of social mentions that are commonly important to the various moderators and therefore may be used to generate new listening rules that better track the social mentions that the collection of moderators are commonly reviewing using their filter rules.

It should be understood that an analysis of information from any combination of moderated social mentions, non-moderated social mentions, listening rules 312, and filter rules 318 may be employed by the analysis component 324 when generating new rules. Any and all such variations are contemplated to be within the scope of embodiments of the present invention.

New rules generated by the analysis component 324 may be new listening rules and/or new filter rules. In some embodiments, the analysis component 324 may be employed to generate new listening rules; while in other embodiments, the analysis component 324 may be employed to generated new filter rules.

Because changing the listening rules 312 to new listening rules will result in less social data being captured, it may be possible that social mentions that should be moderated would not be captured at all by the new rules. In other words, the new listening rules could be too narrow to meet a company's needs. Therefore, it may be desirable to first implement new rules generated by the analysis component as new filter rules. As such, social mentions are still captured since the previous listening rules are still being used. Instead, the social mentions presented via the new filter rules are narrowed. By taking this approach, a moderator may determine the ability of the new rules to effectively filter social mentions to relevant social mentions without inadvertently filtering social mentions that should be moderated. This could be done by looking at the filtered and unfiltered social mentions. If the new rules seem appropriate, the new rules could then be applied as new listening rules.

The rules generation component 322 may also include an accuracy metrics component 326 configured to generate accuracy metrics for new rules. For instance, one accuracy metric may generally reflect the ability of a new rule to reduce the number of social mentions captured (in the case of a listening rule) or presented for review after filtering (in the case of a filter rule). This accuracy metric may be determined by applying the new rule to previously captured social mentions and comparing the number of social mentions captured/presented by the new rule with the number of social mentions captured/presented using the previous rule. Another accuracy metric may indicate the effectiveness of the new rule in capturing (in the case of a listening rule) or otherwise providing for review after filtering (in the case of a filter rule) social mentions that are likely to be moderated. The effectiveness of the new rule in capturing/presenting social mentions likely to be moderated may be estimated by identifying the percentage of previously moderated social mentions that are captured/presented by the new rule.

As a specific example to illustrate the accuracy metrics, suppose a previous listening rule resulted in capturing 1000 social mentions and 100 of those social mentions were moderated. Suppose also that applying a new listening rule to the 1000 social mentions results in only 700 of the 1000 social mentions meeting the criteria of the new listening rule. Accordingly, the new listening rule would be expected to reduce the number of social mentions captured by 30%. Suppose further that the 700 social mentions meeting the criteria of the new listening rule include 99 of the 100 moderated social mentions. Accordingly, the new listening rule would be expected to capture 99% of the social mentions likely to be moderated.

The accuracy metrics calculated by the accuracy metrics component 326 may be presented to a user (e.g., a person in charge of the company's social networking review/moderation program) in conjunction with the new rules. This may allow the user to decide whether or not to implement new rules based on whether the trade-off of reduced social mentions to review justifies the likelihood of missing some social mentions that should be moderated. For example, if the accuracy metrics indicate the new rule is expected to provide 25% less social mentions while capturing 99% of social mentions likely requiring moderation, the user may decide that the new rules should be implemented. However, if the accuracy metrics indicate the new rule will reduce the number of social mentions by 15% while only capturing 90% of social mentions likely requiring moderation, the user may decide to not implement the rules.

An analysis UI 328 may be provided that presents new rules and/or accuracy metrics to a user. This allows the user to review details of the new rules and/or accuracy metrics and make a determination regarding whether to implement the new rules. For instance, the analysis UI 328 may provide a control that allows the user to accept the new rules for implementation or to reject the rules.

In some embodiments, the analysis UI 328 may be configured to allow the user to make manual changes to the new rules. For instance, the analysis UI 328 may present details of the new rules, including the various criteria included in the new rules and/or changes being made to criteria of the existing listening rules 312 and/or filter rules 318. The user may view the criteria and make changes if desired. Any changes made by the user may be applied to the new rules.

Additionally, the accuracy metrics component 326 may calculate new accuracy metrics based on any user changes to the new rules, and the new accuracy metrics may be presented to the user. This allows the user to make changes to the new rules and see how the changes affect the capture of social mentions. As such, the user can make different changes until desired accuracy metrics are achieved, and then the user may decide to implement the new rules with the user's changes.

In further instances, the analysis component UI 328 may allow the user to specify desired accuracy metrics. The analysis component 324 and accuracy metrics component 326 may then operate to generate new rules that satisfy the specified accuracy metrics. This would prevent the user from having to manually make changes until desired accuracy metrics are met.

Figure 4:
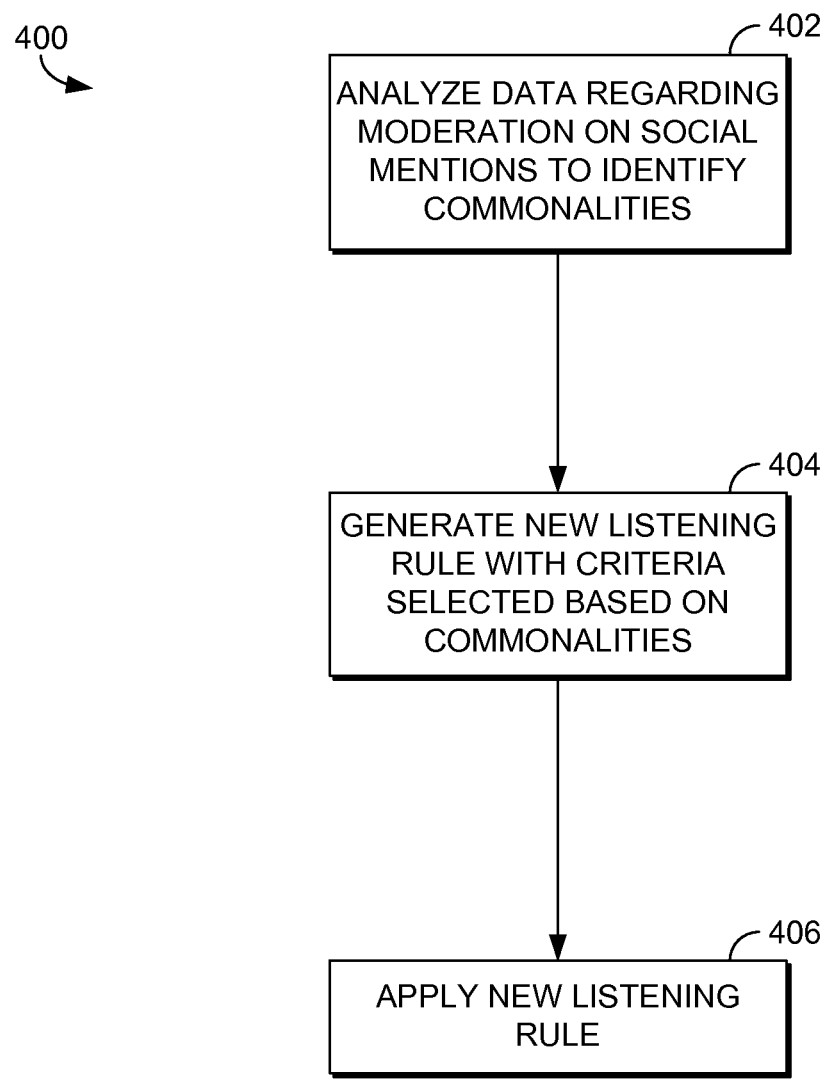
FIG. 4 is a flow diagram showing a method for analyzing moderation data to generate new listening rules in accordance with an embodiment of the present invention.

Turning now to FIG. 4, a flow diagram is provided that illustrates a method 400 for analyzing moderation data to generate a new listening rule. As shown at block 402, data regarding moderation on social mentions is analyzed (for instance, by the analysis component 324 of FIG. 3). The moderation data may have been derived by applying a listening rule defined by or on behalf of a company to capture social mentions, presenting the social mentions in a moderation tool, and capturing data regarding moderation actions taken on some of the social mentions. The moderation data may include data indicating which social mentions were moderated. In other instances, richer data may be provided, such as when each moderation action was taken, the identity of the moderator taking the moderation action, and the type of moderation action taken.

The analysis of moderation data at block 402 may include analyzing text and/or metadata of moderated social mentions to identify commonalities among those social mentions, such as common words or phrases contained in the social mentions and/or common metadata attributes. Alternatively or additionally, the analysis may include analyzing text and/or metadata of non-moderated social mentions to identify commonalities among those social mentions. Further, criteria of an existing listening rule and/or any filter rule used by the moderation tool may be considered as part of the analysis.

A new listening rule is generated based on the analysis (for instance, by the analysis component 324 of FIG. 3), as shown at block 404. The new listening rule may include criteria selected based on the analysis to better capture social mentions that are likely to be moderated while reducing the number of social mentions not likely to be moderated. Although the method 400 discusses generating a single new listening rule, it should be understood that multiple new listening rules may be generated. The new listening rule may be generated by providing an entirely new listening rule or by modifying an existing listening rule.

The new listening rule is applied for the purpose of capturing new social data, as shown at block 406. For instance, the analysis component 324 of FIG. 3 may update the listening rules of the listening component 310, which may capture new social data using the new listening rules. In some instances, the new listening rule may be applied automatically by the system. In other instances, the new listening rule may be presented to a user, who may decide whether to apply the new listening rule. Additionally, in some instances, the user may be given the ability to modify the new listening rule before applying the new listening rule to capture new social data. The new listening rule may replace an existing listening rule, update an existing listening rule, or be used in addition to an existing listening rule.

It should be understood that in some embodiments, the process of analyzing moderation data may be repeated as new moderation data becomes available to update the listening rule used by the system based on changes in the way social mentions are moderated.

Figure 5:
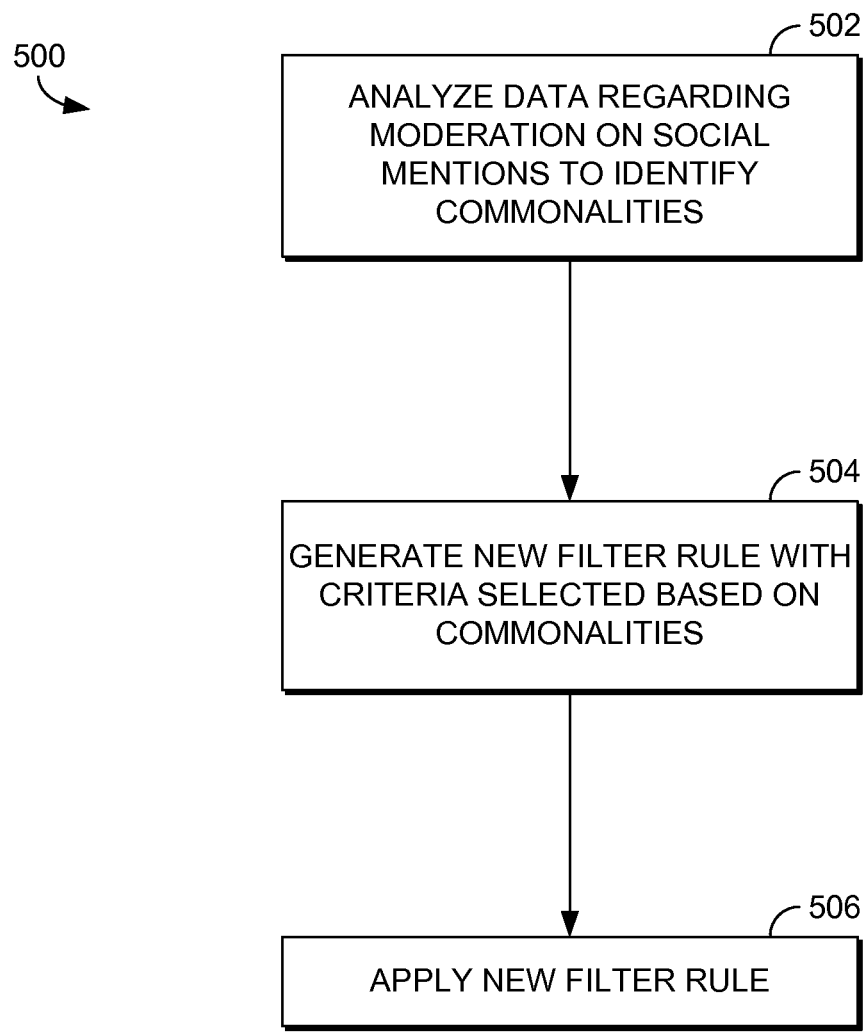
FIG. 5 is a flow diagram showing a method for analyzing moderation data to generate new filter rules in accordance with an embodiment of the present invention.

With reference now to FIG. 5, a flow diagram is provided that illustrates a method 500 for analyzing moderation data to generate a new filter rule. As shown at block 502, data regarding moderation on social mentions is analyzed, for instance, using the analysis component 324 of FIG. 3. The moderation data may have been derived by applying a listening rule defined by or on behalf of a company to capture social mentions, presenting the social mentions in a moderation tool, and capturing data regarding moderation actions taken on some of the social mentions. The moderation data may include data indicating which social mentions were moderated. In other instances, richer data may be provided, such as when each moderation action was taken, the identity of the moderator taking the moderation action, and the type of moderation action taken.

The analysis of moderation data at block 502 may include by analyzing text and/or metadata of moderated social mentions and/or non-moderated social mentions to identify commonalities similar to the analysis of block 402 discussed above with reference to FIG. 4. Additionally, criteria of an existing listening rule and/or filter rule may be taken in consideration during the analysis.

A new filter rule is generated based on the analysis at block 504, for instance, using the analysis component 324 of FIG. 3. The new filter rule is designed to better identify social mentions that are likely to be moderated. Although the method 500 discusses generating a single filter rule, it should be understood that multiple new filter rules may be generated. The new filter rule may be generated by providing an entirely new filter rule or by modifying an existing filter rule.

The new filter rule is applied when new social data is captured, as shown at block 506. For instance, the analysis component 324 of FIG. 3 may update the filter rules of the moderation component 316. In some instances, the new filter rule may be applied automatically by the system. In other instances, the new filter rule may be presented to a user, who may decide whether to apply the new filter rule. Additionally, in some instances, the user may be given the ability to modify the new filter rule before applying the new filter rule in the moderation tool. The new filter rule may replace an existing filter rule, update an existing filter rule, or be used in addition to an existing filter rule.

It should be understood that in some embodiments, the process of analyzing moderation data may be repeated as new moderation data becomes available to update the filter rule used by the system based on changes in the way social mentions are moderated.

Figure 6:
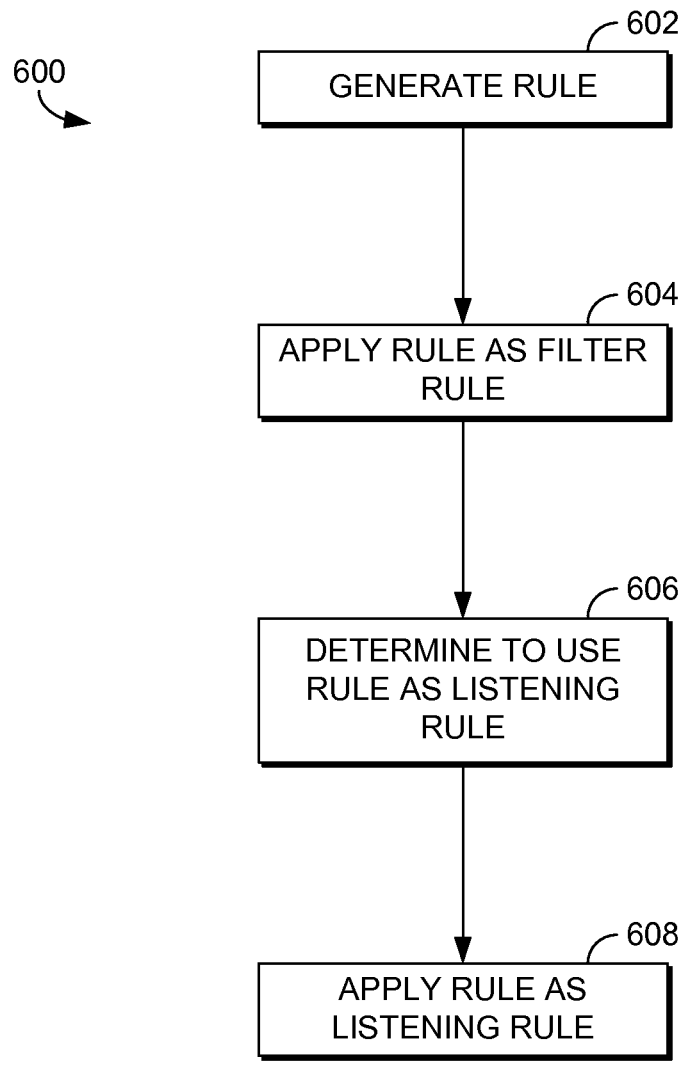
FIG. 6 is a flow diagram showing a method for generating a new rule based on analysis of moderation data and employing that new rule to filter social mentions and subsequently for capturing new social mentions in accordance with an embodiment of the present invention.

In some instances, analysis of moderation data may be used to create criteria for a general rule, which may first be applied as a filter rule and then subsequently applied as a listening rule. This is reflected in the method 600 illustrated by the flow diagram of FIG. 6. As shown at block 602, a rule is generated, for instance, using the analysis component 324 of FIG. 3. This may be performed, for instance, by analyzing data regarding moderated social mentions, non-moderated social mentions, an existing listening rule, and/or an existing filter rule. The rule includes certain criteria of text and/or metadata for capturing and/or filtering social mentions. Although the method 600 discusses only a single rule, it should be understood that multiple rules may be generated and used in conjunction.

The rule is first applied as a filter rule in a moderation tool, as shown at block 604. For instance, the analysis component 324 of FIG. 3 may update the filter rules of the moderation component 316. This allows a moderator to use the rule and determine how well the rule operates in capturing social mentions that are likely to be moderated while reducing the number of social mentions that need to be reviewed. In particular, because the rule is applied as a filter rule in the moderation tool, the previously used listening rule has not been changed. Therefore, the moderator can view social mentions that are captured by the listening rule but not selected for viewing based on the filter rule (i.e., the social mentions removed by the filter rule). Based on this review, the moderator may determine that the social mentions that were removed by the filter rule don't contain a significant number of social mentions that should be moderated, and therefore, the rule could be safely applied as a listening rule. Accordingly, as shown at block a determination is made to use the rule as a new listening rule (for instance, by the analysis component 324 of FIG. 3), as shown at block 606. The rule is applied as a new listening rule, as shown at block 608. For instance, the analysis component 324 of FIG. 3 may update the listening rules of the listening component 310.

The determination to use the rule as a new listening rule may be done manually by the moderator indicating to the system to employ the rule as a new listening rule. In some instances, however, the system can be configured to automatically apply the rule as a new listening rule if certain conditions are met. For instance, the system may track whether a moderator takes any moderation actions on social mentions that were not selected for viewing by the filter rule. If moderation actions have not been taken on a threshold number or percentage of those social mentions, this may be indicative that the rule is appropriate for use as a listening rule. Accordingly, based on a determination that a threshold number or percentage of social mentions filtered from viewing has not been subsequently moderated, the system may automatically apply the rule as a listening rule.

Figure 7:
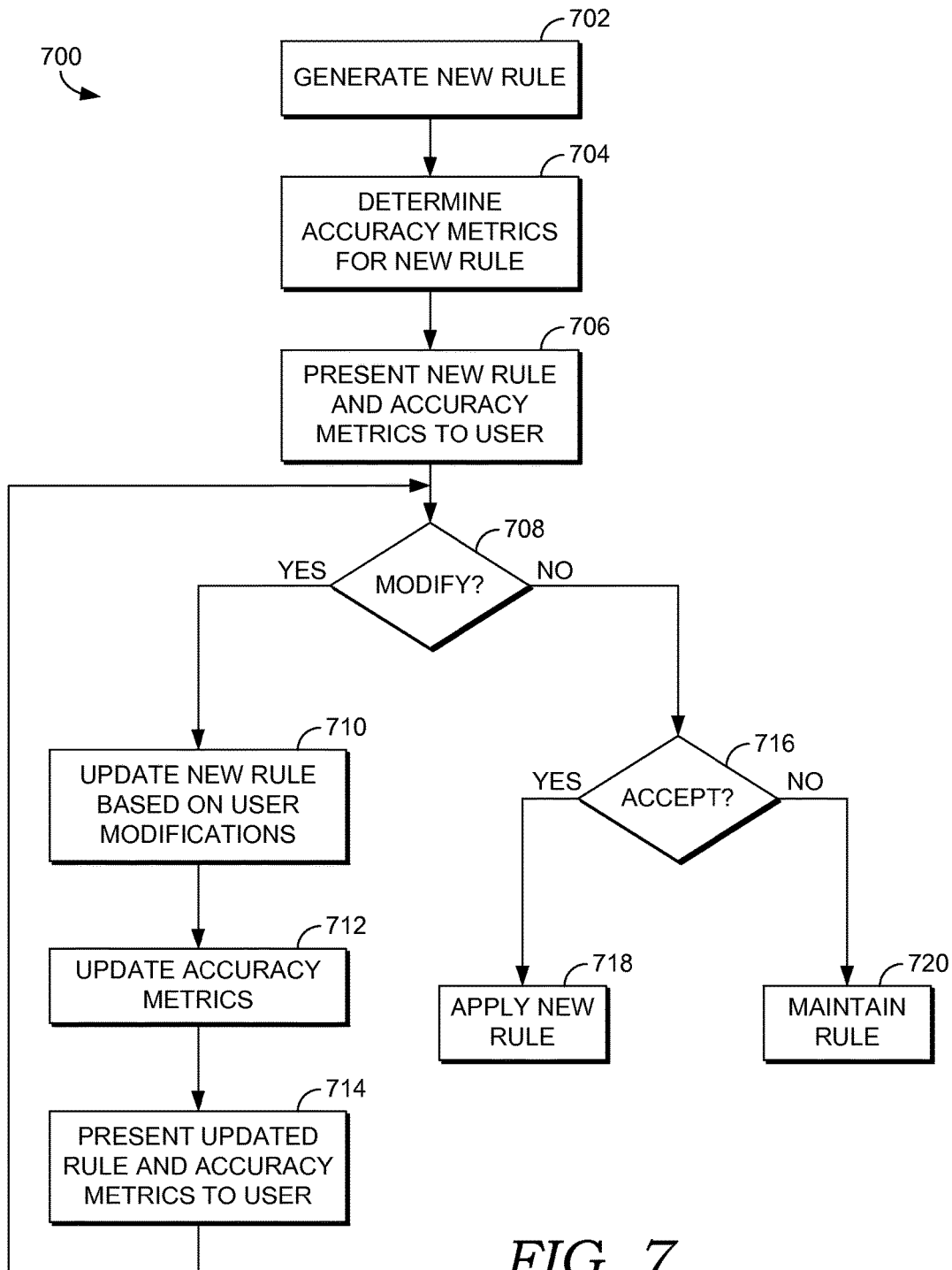
FIG. 7 is a flow diagram showing a method for providing accuracy metrics in conjunction with new rules for capturing and/or filtering social mentions and allowing a user to modify and/or accept the new rules in accordance with an embodiment of the present invention.

Turning now to FIG. 7, a flow diagram is provided that illustrates a method 700 for providing accuracy metrics in conjunction with new rules for capturing and/or filtering social mentions and allowing a user to modify and/or accept the new rules. Initially, as shown at block 702, a new rule is generated (for instance, using the analysis component 324 of FIG. 3). This may be performed, for instance, by analyzing data regarding moderated social mentions, non-moderated social mentions, an existing listening rule, and/or an existing filter rule. The rule may be intended as a listening rule and/or a filter rule and may include certain criteria of text and/or metadata for capturing and/or filtering social mentions. Although the method 700 discusses only a single rule, it should be understood that multiple rules may be generated and used in conjunction.

Accuracy metrics are determined for the new rule at block 704, for instance, by the accuracy metrics component 326 of FIG. 3. As discussed previously, one accuracy metric may generally reflect the ability of the new rule to reduce the number of social mentions captured (in the case of a listening rule) or presented for review after filtering (in the case of a filter rule). This accuracy metric may be determined by comparing the number of social mentions captured/presented by the new rule with the number of social mentions captured/presented using the previous rule. Another accuracy metric may indicate the effectiveness of the new rule in capturing (in the case of a listening rule) or otherwise providing for review after filtering (in the case of a filter rule) social mentions that are likely to be moderated. The effectiveness of the new rule in capturing/presenting social mentions likely to be moderated may be estimated by identifying the percentage of previously moderated social mentions that are captured/presented by the new rule.

The new rule and accuracy metrics are presented to a user (for instance, by the analysis UI 328 of FIG. 3), as shown at block 706. The user may be a moderator or an administrator responsible for coordinating the social analysis program for a company. The user may review details of the new rule, including the criteria of the rule, and the accuracy metrics associated with the rule.

In some instances, the user may decide to make changes to the new rule. For instance, the user may add, remove, or change criteria of the new rule. Accordingly, a determination is made at block 708 (for instance, by the analysis UI 328) regarding whether a user change to the new rule has been received. If a user change has been received, the criteria of the new rule is updated based on the user change (for instance, by the analysis component 324 of FIG. 3), as shown at block 710. Additionally, the accuracy metrics are updated in accordance with the updated rule (for instance, by the accuracy metrics component 326 of FIG. 3), as shown at block 712. The updated rule and updated accuracy metrics are displayed to the user (for instance by the analysis UI 328 of FIG. 3), as shown at block 714. As such, the user can review details of the updated rule and the corresponding accuracy metrics to determine if additional changes are warranted. If so, the process of updating the rule and accuracy metrics at blocks 710, 712, and 714 is repeated.

If the user is done making changes or if no changes are made, the user may decide to accept the new/updated rule. Accordingly, a determination is made regarding whether the user has accepted the new/updated rule (for instance, by the analysis UI 328 of FIG. 3), as shown at block 716. If so, the new/updated rule is applied as either a new listening rule or new filter rule, as shown at block 718. For instance, the analysis component 324 of FIG. 3 may update the listening rules of the listening component 310 or the filter rules of the moderation component 316 with the new rule. In some instances, the user can decide whether to apply the rule as for either listening or filtering purposes. If the user decides not to accept the rule, the existing listening rule and/or filter rule is maintained and the new rule may be discarded, as shown at block 720.

Figure 8:
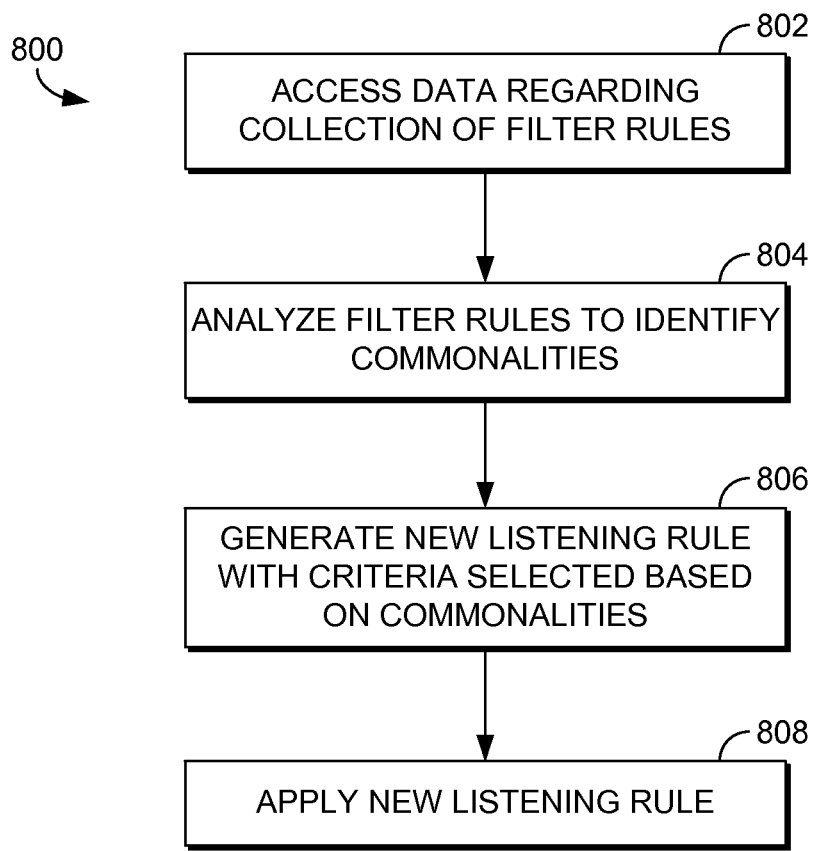
FIG. 8 is a flow diagram showing a method for employing filter rules to generate new listening rules in accordance with an embodiment of the present invention.

In some instances, a new listening rule may be generated independent of moderation data and instead based on filter rules used by moderators within the moderation tool. FIG. 8 is a flow diagram showing a method 800 for employing filter rules to generate a new listening rule. As shown at block 802, data regarding a collection of filter rules is accessed, for instance, by the analysis component 324 of FIG. 3. The filter rules may be filter rules used by different moderators of a company. The filter rules are analyzed to identify commonalities of the filter rules at block 804, for instance by the analysis component 324 of FIG. 3. This may include identifying common criteria used by the filter rules. Based on the analysis, a new listening rule may be generated (for instance, by the analysis component 324 of FIG. 3), as shown at block 806. Generally, the new listening rule may include criteria common to the collection of filter rules as determined by the analysis. The new listening rule may then be applied, as shown at block 808. For instance, the analysis component 324 of FIG. 3 may update the listening rules of the listening component 310 with the new listening rule. While the method 800 illustrates generating and applying a single listening rule, it should be understood that multiple listening rules may be similarly generated and applied.

In further embodiments, social mentions for which a particular type of action have taken may be identified, and data regarding those social mentions may be analyzed to identify what types of social mentions are likely to require that particular type of action. Based on the analysis, the particular type of action may be automatically taken on some social mentions or some social mentions may be marked as recommended for that particular type of action. A specific example to illustrate would be escalation actions. As discussed previously, some actions taken on social mentions by moderators may be flagging the social mentions for escalation, which may involve review of the social mentions by other moderators within the company. The system may identify escalated social mentions and analyze those social mentions. Based on the analysis, escalation rules may be generated that cause newly captured social mentions to be automatically escalated or marked as recommended for escalation.

Figure 9:
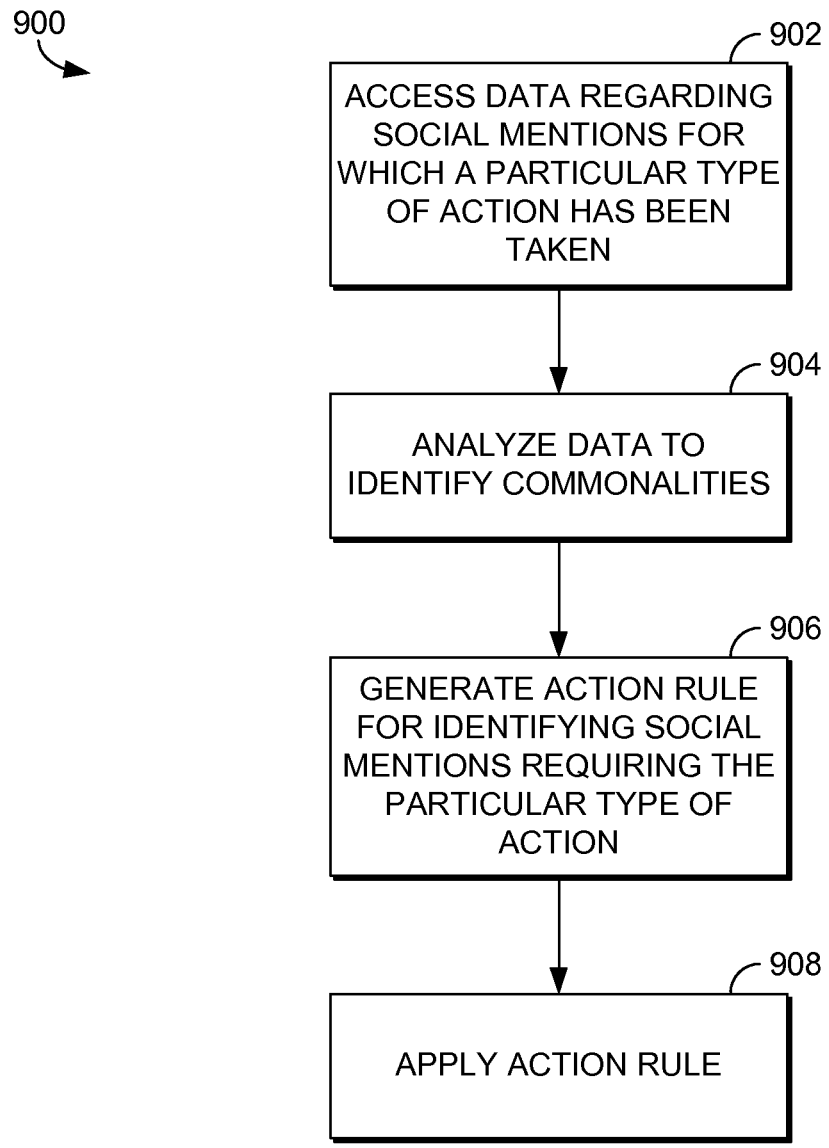
FIG. 9 is a flow diagram showing a method for analyzing data regarding social mentions for which a particular type of action has been taken for generating action rules to help identify social mentions likely requiring that particular type of action in accordance with an embodiment of the present invention.

FIG. 9 is a flow diagram that shows a method 900 for analyzing actions that illustrates this process. As shown at block 902, data is accessed regarding a particular type of action taken on social mentions, for instance, by the analysis component 324 of FIG. 3. In particular, social mentions may initially be captured using listening rules and presented in a moderation tool. The social mentions may be reviewed by a moderator and a particular type of action may be taken on some of the social mentions. Data regarding those social mentions may then be accessed. The data may include the text of the social mentions and/or metadata associated with those social mentions.

The data regarding those social mentions is analyzed at block 904, for instance, by the analysis component 324 of FIG. 3. This may include analyzing text and/or metadata of the social mentions to identify commonalities among those social mentions, such as common words or phrases contained in the social mentions and/or common metadata attributes.

Based on the analysis, an action rule for identifying social mentions likely requiring that type of action is generated (for instance, by the analysis component 324), as shown at block 906. The action rule may include particular words, phrases, and/or metadata attributes. It should be understood that any number of action rules may be generated within the scope of embodiments of the present invention.

The action rule is applied to newly captured social mentions, as shown at block 908. For instance, the analysis component 324 may update the moderation component 316 with the action rule, and the moderation component 316 may apply the action rule to captured social mentions. In some instances, the particular type of action is automatically taken on social mentions that satisfy the action rule. In other instances, social mentions that satisfy the action rule are marked for that particular type of action, and a moderator may be prompted to review those social mentions and determine whether to take the recommended action.

As can be understood, embodiments of the present invention provide for, among other things, analysis of moderation data to generate or improve the listening and/or filter rules used to capture and/or present social mentions. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
   utilizing an initial listening rule to capture an initial set of social mentions from one or more social networks;
   from the initial set of social mentions, receiving a subset of moderated social mentions for which moderation actions have been taken by a moderator responsible for reviewing social mentions for a company and deciding whether to take moderation actions;
   analyzing text and metadata of the subset of moderated social mentions to identify common text and/or common metadata from the subset of moderated social mentions;
   generating one or more new listening rules by modifying the initial listening rule with criteria corresponding to the common text and/or common metadata identified by analyzing the text and metadata of the subset of moderated social mentions; and
   applying the one or more new listening rules to capture new social mentions from the one or more social networks.

2. The non-transitory computer storage medium of claim 1, wherein analyzing text and metadata of the subset of moderated social mentions comprises analyzing text and metadata of social mentions for which a particular type of moderation action has been taken, the particular type of moderation action having been selected from a plurality of available types of moderation actions.

3. The non-transitory computer storage medium of claim 1, wherein the operations further comprise analyzing text and metadata of social mentions for which moderation actions have not been taken to identify a separate set of one or more commonalities, wherein the criteria for the one or more new listening rules is identified based on the common text and/or common metadata from the subset of moderated social mentions and the separate set of one or more commonalities from the social mentions for which moderation actions have not been taken.

4. The non-transitory computer storage medium of claim 1, wherein the one or more new listening rules are generated based at least in part on one or more initial listening rules, the one or more initial listening rules including the initial listening rule.

5. The non-transitory computer storage medium of claim 1, wherein generating the one or more new listening rules comprises:
   generating one or more proposed listening rules based on the common text and/or common metadata;
   providing the one or more proposed listening rules for presentation to a user;
   receiving an acceptance of the one or more proposed listening rules from the user; and
   providing the one or more proposed listening rules as the one or more new listening rules based on the acceptance.

6. The non-transitory computer storage medium of claim 1, further comprising:
   calculating one or more accuracy metrics for the one or more new listening rules, the one or more accuracy metrics indicating an ability of the one or more new listening rules to reduce a number of social mentions captured by the initial listening rule; and
   providing the one or more accuracy metrics for presentation in a moderation user interface.

7. The non-transitory computer storage medium of claim 6, wherein the one or more accuracy metrics are calculated by applying the one or more new listening rules to the initial set of social mentions and comparing a number of social mentions captured by the one or more new listening rules to the number of social mentions captured by the initial listening rule.

8. The non-transitory computer storage medium of claim 6, wherein the one or more accuracy metrics include an effectiveness of the one or more new listening rules to capture social mentions likely to be moderated, the effectiveness determined by identifying a percentage of previously moderated social mentions captured by the one or more new listening rules.

9. The non-transitory computer storage medium of claim 1, wherein the one or more new listening rules are generated at least in part based on a plurality of filter rules used for filtering social mentions for presentation in a moderation user interface, and wherein the one or more new listening rules are generated based on commonalities among each filter rule of the plurality of filter rules.

10. The non-transitory computer storage medium of claim 1, wherein the operations further comprise:
generating one or more filter rules based on analysis of the text and metadata of the subset of moderated social mentions; and
applying the one or more filter rules to select a subset of new social mentions from the new social mentions for presentation in a moderation user interface.

11. The non-transitory computer storage medium of claim 1, further comprising receiving a specified accuracy metric for capturing social mentions, wherein the one or more new listening rules are generated based on the specified accuracy metric.

12. The non-transitory computer storage medium of claim 1, wherein the moderation action is a response by the moderator to a social mention.

13. A computer-implemented method comprising:
analyzing, by a computing device, text and metadata of moderated social mentions to identify common text and/or common metadata, the moderated social mentions comprising a subset of filtered social mentions for which moderation actions have been taken by a moderator associated with a company to manage the company's brand, wherein the subset of filtered social mentions is filtered from a set of social mentions captured from one or more social networks using an initial listening rule;
generating one or more new listening rules by modifying the initial listening rule with criteria corresponding to the common text and/or common metadata identified by analyzing the text and metadata of the moderated social mentions; and
employing the one or more new listening rules to capture new social mentions from the one or more social networks for moderation by the moderator.

14. The computer-implemented method of claim 13, wherein analyzing the text and metadata of the moderated social mentions comprises analyzing text and metadata of social mentions for which a particular type of moderation action has been taken, the particular type of moderation action having been selected from a plurality of available types of moderation actions.

15. The computer-implemented method of claim 13, wherein generating the one or more new listening rules comprises analyzing text and metadata of social mentions for which moderation actions have not been taken to identify a separate set of one or more commonalities, wherein the criteria for the one or more new listening rules is identified based on the common text and/or common metadata from the moderated social mentions and the separate set of commonalities from the social mentions for which moderation actions have not been taken.

16. The computer-implemented method of claim 13, wherein generating the one or more new listening rules comprises:
generating one or more proposed listening rules based on the common text and/or common metadata;
providing the one or more proposed listening rules for presentation to a user;
receiving an acceptance of the one or more proposed listening rules from the user; and
providing the one or more proposed listening rules as the one or more new listening rules based on the acceptance.

17. The computer-implemented method of claim 16, wherein generating the one or more new listening rules further comprises receiving a user modification to the one or more proposed listening rules prior to the acceptance of the one or more proposed listening rules.

18. The computer-implemented method of claim 13, further comprising:
calculating one or more accuracy metrics for the one or more new listening rules, the one or more accuracy metrics indicating an ability of the one or more new listening rules to reduce a number of social mentions captured by the initial listening rule; and
providing the one or more accuracy metrics for presentation in a moderation user interface.

19. A computer-implemented method comprising:
applying, by a computing device, a set of filter rules to filter out social mentions to provide a set of filtered social mentions, the social mentions previously captured from one or more social networks by a listening rule;
identifying moderated social mentions from the set of filtered social mentions, the moderated social mentions comprising a subset of the filtered social mentions for which moderation actions have been taken by a moderator to manage a company's brand;
analyzing text and metadata of the subset of the filtered moderated social mentions to identify common text and/or common metadata; and
modifying the listening rule with criteria corresponding to the common text and/or common metadata identified by analyzing the text and metadata of the subset of the filtered moderated social mentions such that the modified listening rule can be applied to capture new social mentions for moderation by the moderator.

20. The computer-implemented method of claim 19, wherein the set of filter rules corresponds with filter rules provided by a plurality of moderators.

* * * * *